United States Patent [19]

Seki

[11] Patent Number: 4,485,541

[45] Date of Patent: Dec. 4, 1984

[54] FASTENER APPLYING APPARATUS

[75] Inventor: Fumio Seki, Toyama, Japan

[73] Assignee: Yoshida Kogyo K.K., Tokyo, Japan

[21] Appl. No.: 363,445

[22] Filed: Mar. 30, 1982

[30] Foreign Application Priority Data

Apr. 9, 1981 [JP] Japan .............................. 56-51270[U]

[51] Int. Cl.³ ............................................. B23P 19/02
[52] U.S. Cl. ........................................ 29/251; 227/8;
192/27; 192/33 R; 192/131 H
[58] Field of Search ............... 29/251; 227/8, 1;
83/545, 546, DIG. 1; 192/131 H, 131 R, 27, 31, 33 R, 38

[56] References Cited

U.S. PATENT DOCUMENTS

| 1,047,349 | 12/1912 | Walsh | 192/131 H |
| 1,085,529 | 1/1914 | Blumberg | 192/131 H |
| 1,121,066 | 12/1914 | Bray | 192/131 H |
| 1,440,894 | 1/1923 | Robin | |
| 2,199,501 | 5/1940 | MacBlane | 192/131 H |
| 3,292,837 | 12/1966 | Heil et al. | |

FOREIGN PATENT DOCUMENTS 357181  8/1922  Fed. Rep. of Germany ... 192/131 H

Primary Examiner—Frederick R. Schmidt
Assistant Examiner—Steven P. Schad
Attorney, Agent, or Firm—Bucknam and Archer

[57] ABSTRACT

An apparatus for applying a fastener to a fabric includes a pair of levers disposed pivotably on each side of a stationary die for interlocking a punch driver and an actuator therefor in such a manner that the former can be activated by the latter only after the levers have been lowered while supporting the fabric horizontally thereon.

2 Claims, 4 Drawing Figures

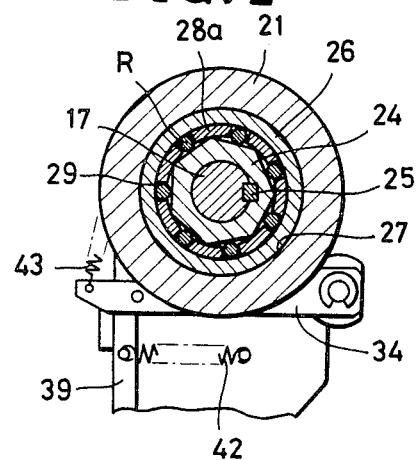
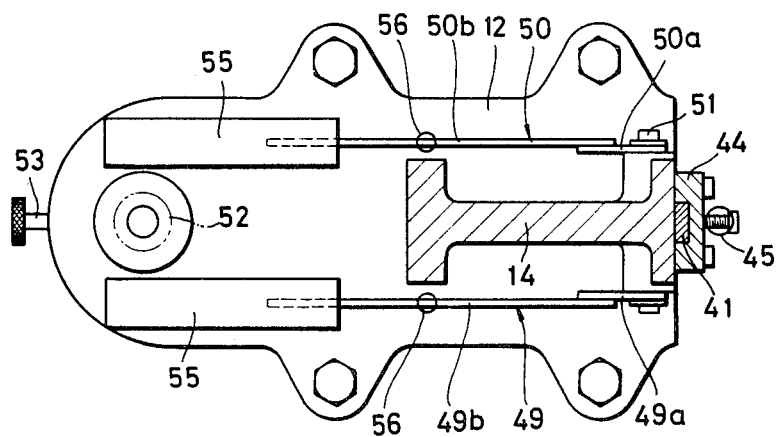

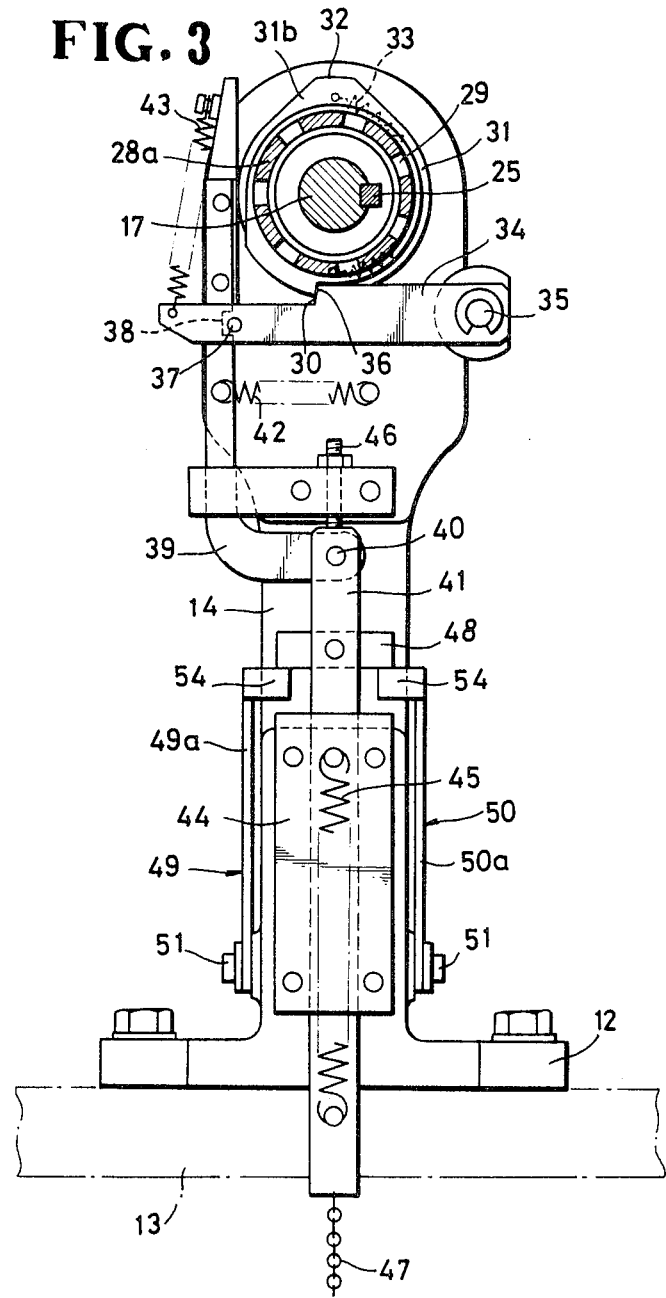

FASTENER APPLYING APPARATUS

BACKGROUND OF THE INVENTION

1. Field of the Invention

The present invention relates to an apparatus for applying fasteners, such as buttons, eyelets, hook-and-eye parts or the like, to the fabric of garments.

2. Prior Art

There have been proposed various apparatus of the type described, in which a fastener is applied to a fabric by a punch driven to move reciprocally toward and away from a stationary die on which the fabric is set, in response to the operation of a foot pedal. In the known apparatus, the fabric must be supported on the die substantially in a horizontal plane, or the applied fastener becomes tilted with respect to the general plane of the fabric and hence is defective from an aesthetic view. Furthermore, if the foot pedal is accidentally stepped during setting of the fabric, an operator might be hurt or damaged on his fingers.

SUMMARY OF THE INVENTION

It is therefore an object of the present invention to provide an apparatus for applying a fastener to a fabric which will reduce or eliminate the foregoing drawback of the prior art.

Another object of the present invention is to provide an apparatus which can apply fasteners neatly onto fabrics without injuring operator's fingers.

A further object of the present invention is to provide an apparatus which includes means for interlocking a punch driver and an actuator therefor in such a manner that the former can be activated by the latter only after a fabric has been set in predetermined position.

According to the present invention, an apparatus includes a rotatable shaft operatively connected to a punch for driving same reciprocally toward and away from a stationary die, upon rotation thereof, and a single revolution clutch disposed between a continuously rotating source of power and the shaft and normally retaining them out of rotational engagement with each other, the single revolution clutch, upon activation by actuating means, interconnecting the power source and the shaft to enable the latter to make one revolution, whereby the punch completes one cycle of reciprocation. A pair of interlocking levers is disposed one on each side of the stationary die and is movable individually with each other into and out of locking engagement with said actuating means, respectively.

Many other advantages, features and additional objects of the present invention will become manifest to those versed in the art upon making reference to the detailed description and the accompanying drawings in which a preferred embodiment incorporating the principles of the present invention is shown by way of illustrative example.

BRIEF DESCRIPTION OF THE DRAWINGS

FIG. 2 is a cross-sectional view taken along the line II—II of FIG. 1;

FIG. 3 is a cross-sectional view taken along the line III—III of FIG. 1; and

FIG. 4, associated with FIG. 2, is a cross-sectional view taken along the line IV—IV of FIG. 1.

DETAILED DESCRIPTION

Figure 1:
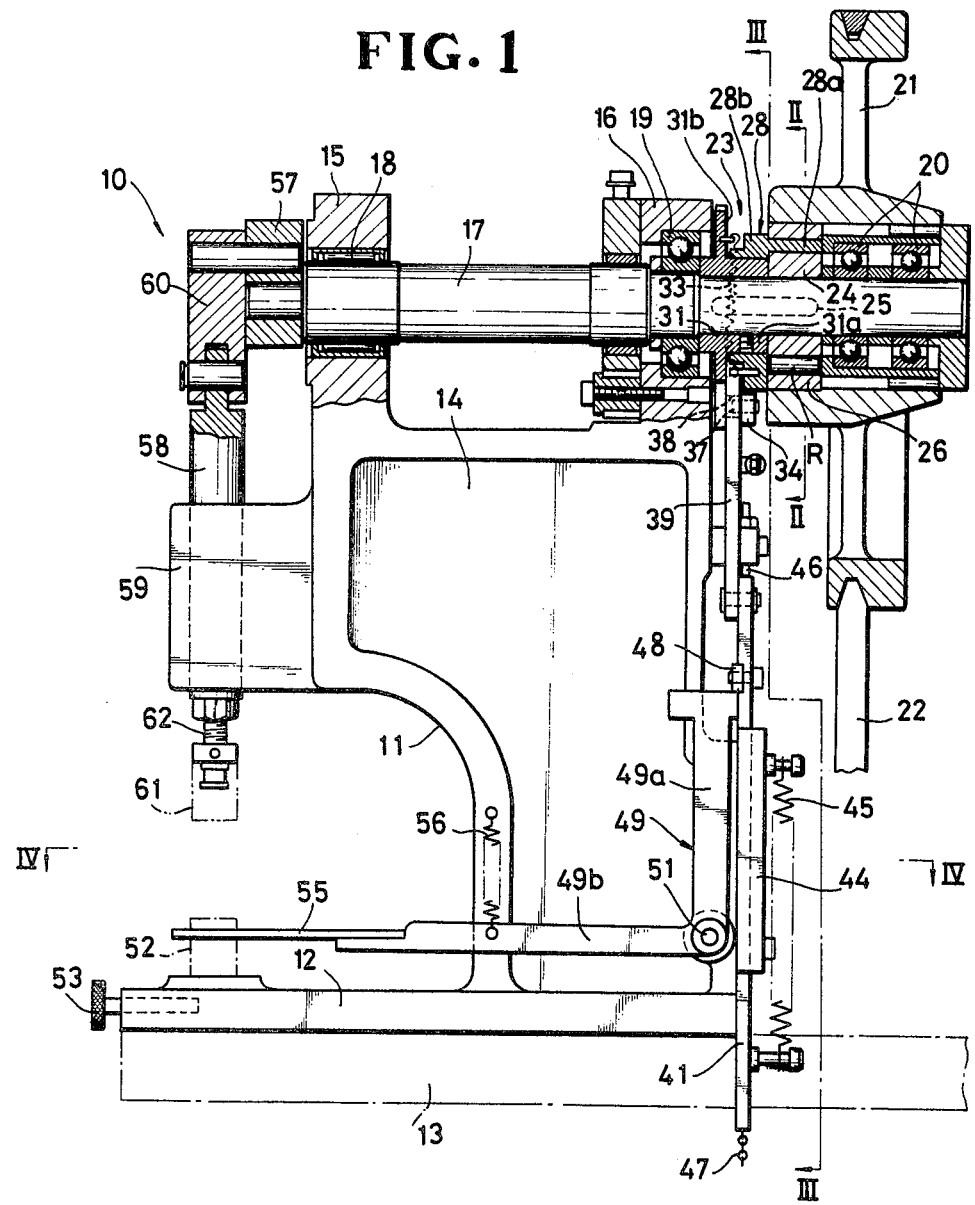
FIG. 1 is a side elevational view, partly in cross section, of an apparatus constructed in accordance with the present invention.

As shown in FIG. 1, an apparatus 10 comprises a generally C-shaped frame 11 including a horizontal table 12 mountable on a rack 13, and a vertical column 14 extending upwardly from the table 12 for supporting essential parts of the apparatus 10. The column 14 has on its upper end a pair of laterally spaced support lugs 15,16 having a pair of bores, respectively, extending in horizontal alignment with each other. A spindle or shaft 17 is rotatably mounted on the lugs 15,16 via a pair of bearings 18,19 fitted in the bores in the lugs 15,16, respectively. One or the rear end of the shaft extends rearwardly beyond the lug 16, on which is rotatably mounted through bearings 20,20 a driven pulley or flywheel 21 of large diameter continuously driven by an electric motor (not shown) through an endless belt 22 trained therearound.

A single revolution clutch assembly 23 is disposed between the flywheel 21 and the shaft 17 for bringing them into and out of rotating engagement with each other. The clutch assembly 23 comprises a polygonal boss 24 fastened with a key 25 to the shaft 17 for corotation therewith, an outer ring or race 26 fitted in a cylindrical bore 27 in the flywheel 21, and an intermediate ring 28 having a segmented annular portion 28a rotatably disposed between the polygonal boss 24 and the outer race 26, a plurality of rollers R being rotatably received in slots 29 in rolling engagement with inner peripheral surface of the outer race 26 and with outer peripheral surface of the polygonal boss 24, as best shown in FIG. 2. The intermediate ring 28 further has an extension 28b projecting toward the support lug 16 and having on its outer periphery a locking jaw 30 (FIG. 3) for purposes described hereinbelow. A flanged cam plate 31 is keyed to the shaft 17 between the support lug 16 and the polygonal boss 24. The cam plate 31 has a cylindrical hub 31a rotatably received in the extension 28b and a flange 31b extending radially outwardly from the hub 31a and having on its periphery a cam face 32. A tension spring 33 is connected at opposite ends to the intermediate ring 28 and the cam plate 31 so as to enable them to rotate together.

As shown in FIG. 3, a locking lever 34 is pivotably mounted on the column 14 by means of a pin 35. The lever 34 has a locking edge 36 adapted for locking engagement with the locking jaw 30 of the intermediate ring 28, and a pin 37 adapted for engagement with a notch or recess 38 formed in a L-shaped lever 39. The L-shaped lever 39 is pivoted by a pin 40 to one end or the upper end of an actuating rod 41 and normally urged against the cam face 32 of the cam plate 30 by a tension spring 42 acting between the lever 39 and the column 14. A tension spring 43 is connected at opposite ends to the distal end of the locking lever 34 and the distal end of the L-shaped lever 39 to urge the locking edge 36 into locking engagement with the locking jaw 30. The actuating rod 41 is slidably received in, and extends through, a guide plate 44 secured to the column 14. A tension spring 45 acts between the guide plate 44 and the actuating rod 41 to urge the latter upwardly against a stop bolt 46. To the other or lower end of actuating rod 41 is connected one end of a chain 47 which is in turn connected to a foot pedal (not shown) pivotably movable for reciprocating the actuating rod 41 against and with the aid of the action of the tension spring 45. A stop 48 is secured to the actuating rod 41 and projects transversely therefrom in opposite directions.

A pair of generally L-shaped interlocking levers 49,50 is pivotably mounted by pins 51 one on each side of the column 14. Each lever 49,50 has a vertical arm 49a,50a extending away from the table 12 and a horizontal arm 49b,50b extending over the table 12 toward a stationary die 52 secured to the table 12 by means of a set bolt 53. The vertical arms 49a,50a are provided at their distal ends with a pair of locking portions in the form of a pair of lateral locking projections 54,54, respectively, extending inwardly toward each other into locking engagement with the stop 48 of the actuating rod 41. Projecting from the distal ends of the respective horizontal arms 49b,50b is a pair of elongated support plates 55,55 extending in juxtaposed relation to one another across the stationary die 52, as shown in FIG. 4. Preferably, the support plates 55,55 lie in flush with the top surface of the stationary die 52 for supporting a fabric (not shown) in a common horizontal plane. A pair of tension springs 56,56 (FIGS. 1 and 2) acts between the column 14 and the interlocking levers 49,50, respectively, to urge the latter to rotate in the clockwise direction as viewed in FIG. 1.

As illustrated in FIG. 1, an eccentric disc 57 is keyed to the other or forward end of the shaft 17 for corotation therewith, and a slide rod 58 is slidably received in a slotted guide block 59, the eccentric disc 57 and the slide rod 58 being linked with each other through a link 60 so that the slide rod 58 reciprocates toward and away from the stationary die 52 upon rotation of the shaft 17. A punch 61 is attached to a plunger 62 secured to the slide rod 58.

In operation, the flywheel 21 is driven by the electric motor (not shown) to rotate continuously in the counterclockwise direction as viewed in FIGS. 2 and 3. Under the illustrated conditions where the locking jaw 30 of the intermediate ring 28 engages with the locking edge 36 of the locking lever 34, the intermediate ring 28 remains immovable and the outer race 26 slips around the annular ring portion 28a so that no power is transmitted from the flywheel 21 to the shaft 17. The actuating rod 41 is also held immovable by locking engagement of the locking projections 54,54 with the stop 48 even when an operator steps on the foot pedal to pull the chain 47 downwardly.

A fabric (not shown) is laid over the die 52 and the support plates 55,55, and then gripped at opposite edges with operator's fingers. As the operator pulls, with his both hands, the gripped fabric edges downwardly toward the table 12, the L-shaped interlocking levers 49,50 angularly move in the counterclockwise direction of FIG. 1 against the action of the tension springs 56,56 whereupon the locking projections 54,54 are brought out of locking engagement with the stop 48 substantially at the same time. Then, the foot pedal is stepped to pull the chain 47 and hence the actuating rod 41 downwardly against the action of the tension spring 45. Descending movement of the actuating rod 41 causes the L-shaped lever 39 to move the locking lever 34 angularly in the counterclockwise direction as viewed in FIG. 3 through the engagement of the recess 38 with the pin 35, whereupon the locking edge 36 is released from locking engagement with the locking jaw 30, thereby activating the single revolution clutch assembly 23. Rotation of the flywheel 21 causes the rollers R to move toward the respective corners of the polygonal boss 24 under the influence of friction created between the rollers R and the inner peripheral surface of the outer race 26. The rollers R wedge between the boss 24 and the outer race 26 so that the movement of the flywheel 21 is transmitted to the shaft 17 via the clutch assembly 23. As the shaft 17 rotates in the counterclockwise direction as viewed in FIG. 3, the cam plate 31, which is coupled through the spring 33 to the intermediate ring 28, rotates in the counterclockwise direction with its cam face 32 held in contact with the L-shaped lever 39. When the vertex of the cam face 32 angularly moves the lever 39 in the counter-clockwise direction of FIG. 3 against the action of the tension spring 42, the pin 35 is released from the recess 38 whereupon the locking lever 34 rotates in the clockwise direction with the aid of the tension spring 43, and abuts against the peripheral edge of the extension 28b for locking engagement with the locking jaw 30. Upon engagement of the locking jaw 30 with the locking edge 36, the rotation of the shaft 17 is stopped. During one revolution of the shaft 17, the slide rod 58 completes one cycle of reciprocation with the aid of the eccentric disc 57 and the link 60, whereby a fastener (not shown) is applied to the garment by the cooperating punch and die 61 and 52. Upon removal of the fabric, the interlocking levers 49,50 return to their initial positions shown in FIG. 1 for locking engagement with the stop 48 of the actuating rod 41.

From the foregoing description of a preferred embodiment, the artisan will appreciate advantageous features of the invention that the fastener is applied neatly onto the fabric without injuring operator's fingers because the interlocking levers 49,50 cooperate to interlock a punch driver system (including the shaft 17, the single revolution clutch 23 and the flywheel 21) and its actuator system (including the locking lever 34, the L-shaped lever 39, the actuating rod 41 and the chain 47) in such a manner that the former can be activated by the latter only after the interlocking levers 49,50 have been lowered while supporting the fabric horizontally thereon.

Although various minor modifications may be suggested by those versed in the art, it should be understood that we wish to embody within the scope of the patent warranted hereon, all such embodiments as reasonably and properly come within the scope of our contribution to the art.

What is claimed is:

1. An apparatus for applying a fastener to a fabric, comprising:
    (a) a stationary die and a punch reciprocally movable towards and away from said die;
    (b) a rotatable shaft operatively connected to said punch for driving same upon rotation thereof;
    (c) a continuously rotating source of power;
    (d) a single revolution clutch disposed between said power source and said shaft and normally retaining them out of rotational engagement with each other, said single revolution clutch including:
    a polygonal boss secured to said shaft,
    an outer ring connected to said power source,
    an intermediate ring rotatably disposed between said boss and said outer ring and having a plurality of angularly spaced slots, said intermediate ring having an annular extension projecting axially beyond said outer ring and said boss, said annular extension having on its outer periphery a locking jaw, and rollers received respectively in said slots in rolling engagement with said boss and said outer ring, and said single revolution clutch, upon activation, interconnecting said power source and said shaft to enable the latter to make one revolution, whereby said punch completes one cycle of reciprocation;

(e) means for actuating said single revolution clutch; and (f) a pair of interlocking levers disposed on each side of said stationary die and movable individually with each other into and out of locking engagement with said actuating means, respectively, said actuating means comprising a foot-operative actuating rod operatively connected to said single revolution clutch and having a stop, each said interlocking lever being pivotally movable and having a locking portion normally held in locking engagement with said stop, said locking portion being released from said stop in response to pivotal movement of said interlocking lever, said actuating means further including:

a cam plate secured to said shaft and having a cylindrical hub rotatably received in said annular extension and a flange extending radially outwardly from said hub, said flange having on its periphery a cam face having a vertex disposed substantially diametrically opposite to said locking jaw, a first tension spring extending between said intermediate ring and said cam plate to enable them to rotate together, a pivotably supported locking lever normally urged against said annular extension and having a locking edge engageable with said locking jaw and a pin spaced from said locking edge, an actuating lever pivotably connected at its one end to said actuating rod and having a recess normally receiving therein said pin, a second tension spring urging said actuating lever against said cam face, a third tension spring acting between said locking lever and said actuating lever to bring said locking edge into locking engagement with said locking jaw, said locking edge being releasable from said locking jaw in response to downward movement of said actuating rod, said pin being released from said recess in response to engagement between said vertex and said actuating lever.

2. An apparatus according to claim 1, each said interlocking lever having an elongated support plate for supporting thereon the fabric.

* * * * *